United States Patent [19]

Cross

[11] Patent Number: 4,700,620
[45] Date of Patent: Oct. 20, 1987

[54] CITRUS JUICE EXTRACTOR

[75] Inventor: Stephen D. Cross, Lakeland, Fla.

[73] Assignee: FMC Corporation, Chicago, Ill.

[21] Appl. No.: 827,581

[22] Filed: Feb. 10, 1986

[51] Int. Cl.⁴ .............................. A23N 1/02; B30B 9/02
[52] U.S. Cl. ........................................ 99/510; 99/509;
100/98 R; 100/108; 100/213
[58] Field of Search ................. 99/495, 509, 510, 513;
100/37, 98 R, 104, 108, 117, 213, 127

[56] References Cited

U.S. PATENT DOCUMENTS

| | | | |
|---|---|---|---|
| 2,780,988 | 2/1957 | Belk et al. | 100/108 |
| 2,856,846 | 10/1958 | Belk | 100/108 |
| 3,236,175 | 2/1966 | Belk | 100/213 X |
| 3,429,257 | 2/1969 | Belk | 100/108 X |
| 4,309,943 | 1/1982 | Larsen et al. | 99/509 |
| 4,376,409 | 3/1983 | Belk | 99/509 |

Primary Examiner—Timothy F. Simone
Attorney, Agent, or Firm—Douglas W. Rudy; Richard B. Megley; Louis J. Pizzanelli

[57] ABSTRACT

Disclosed is a citrus fruit extractor of the type wherein a whole fruit is positioned in one of opposed interfitting cup halves which are provided with means for cutting the skin or rind at diametrically opposed areas. Concurrent movement of one or both cups toward each other compresses the fruit and produces the diametrically opposed cuts. Cutting and compressing ruptures the juice sacks and the juice flows through one of the cut areas of the skin, through a screen and to a collecting trough. In its path to the trough, the juice makes little or no contact with the freshly cut surfaces of the skin.

3 Claims, 10 Drawing Figures

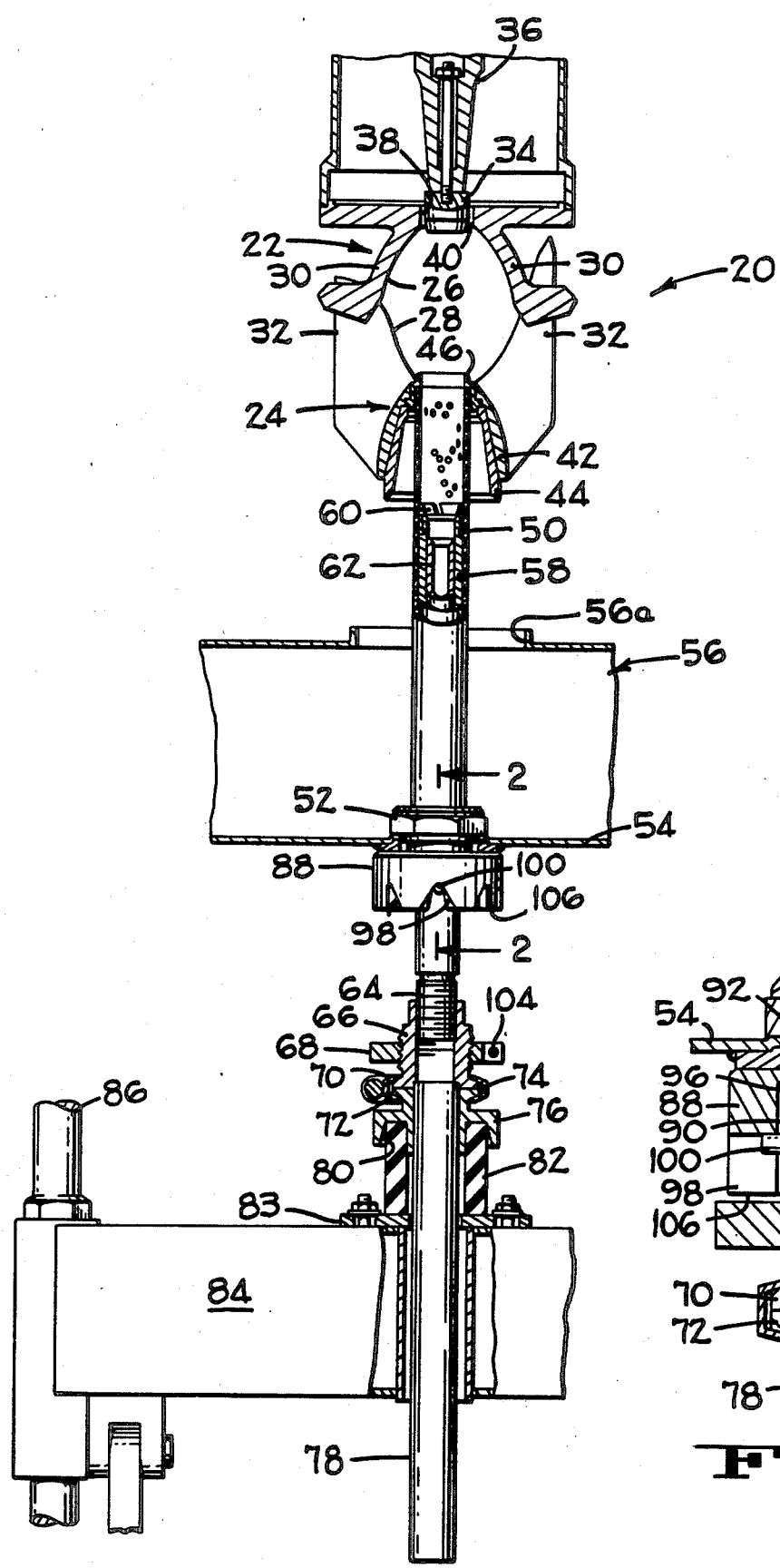

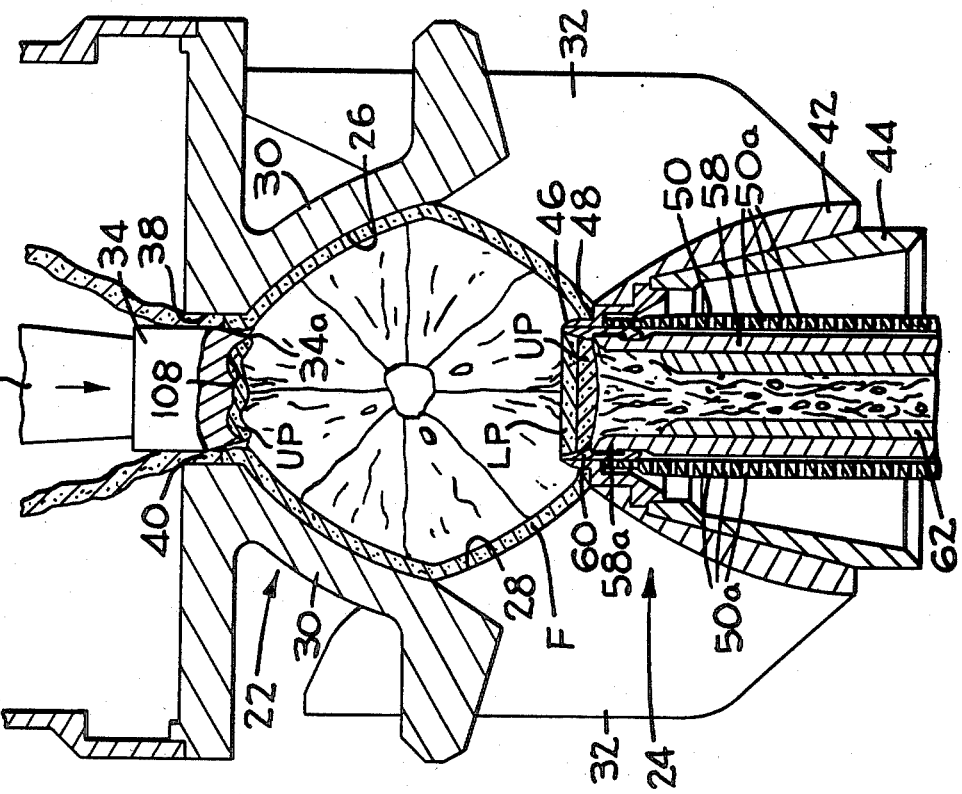
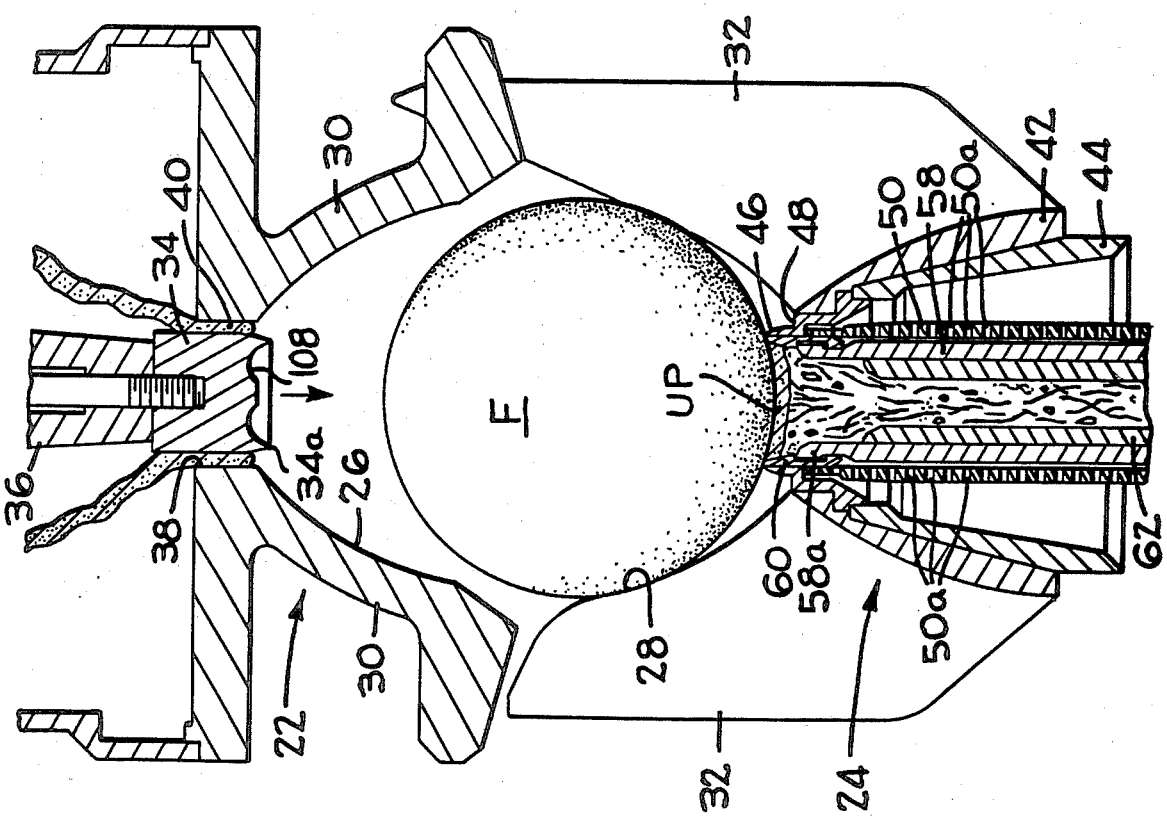

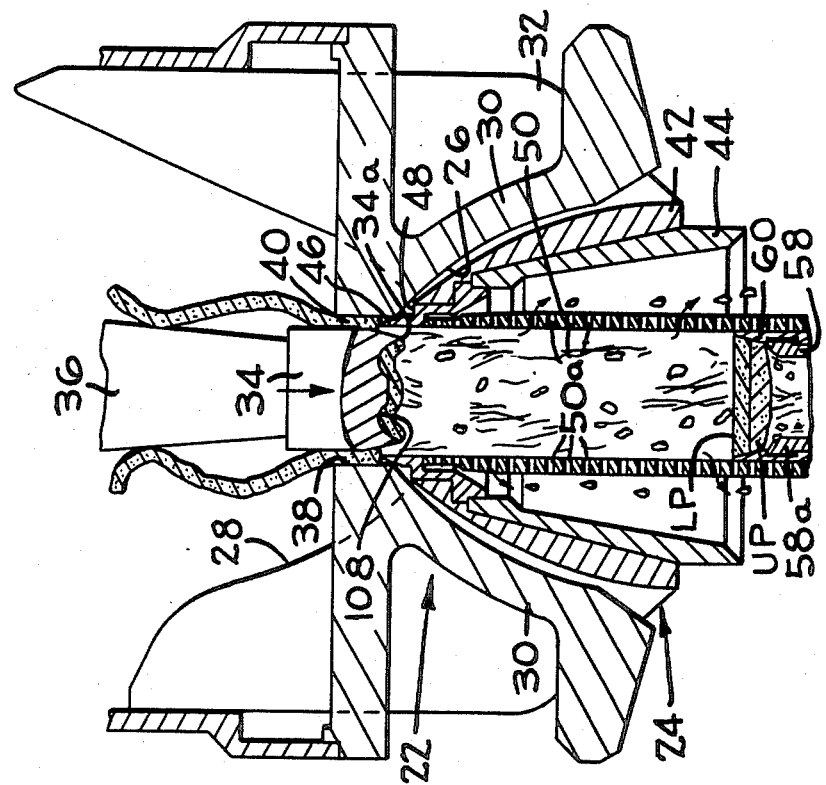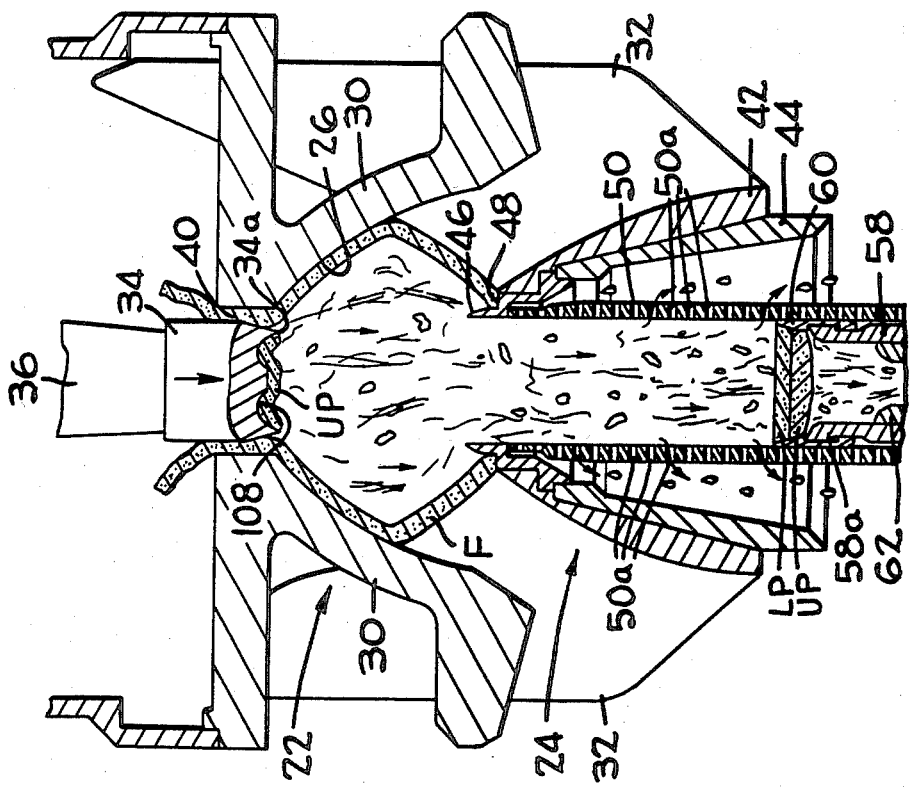

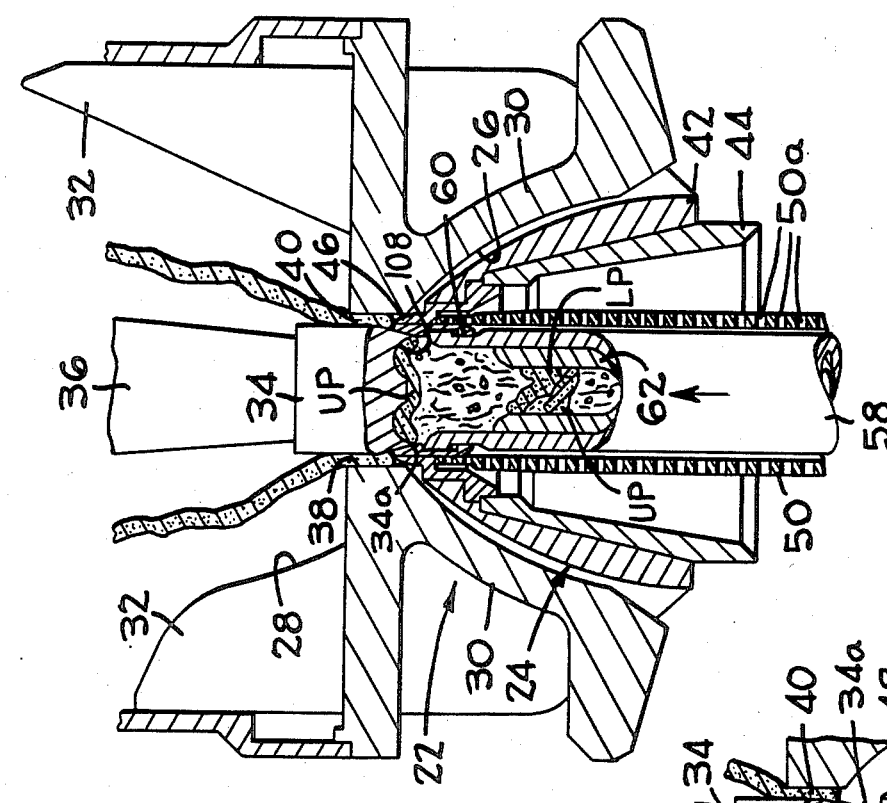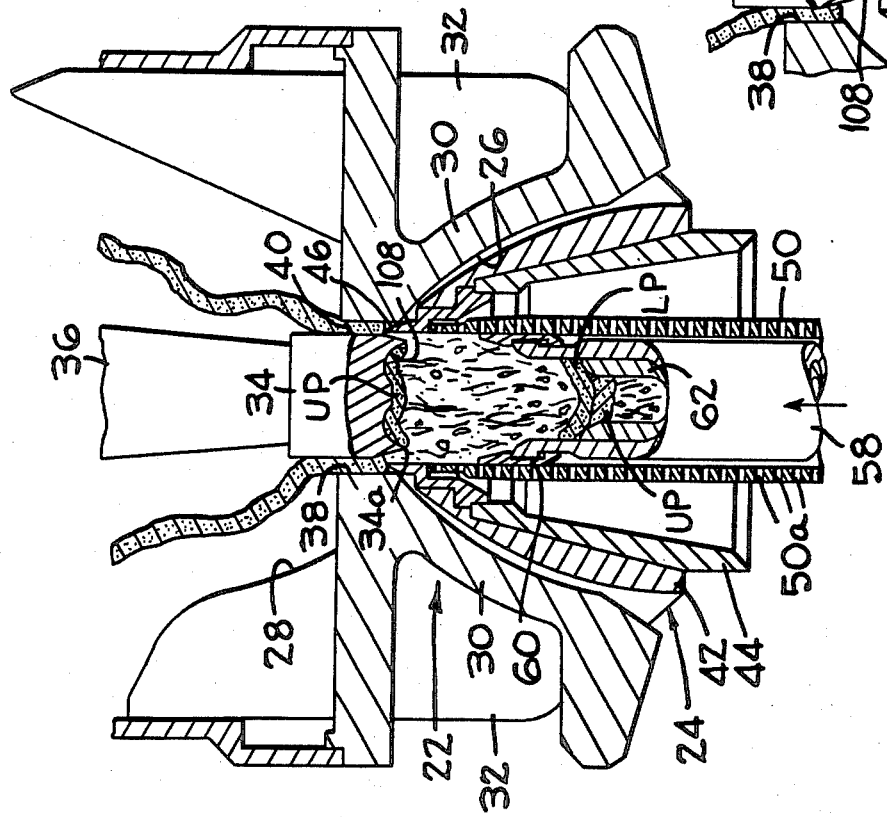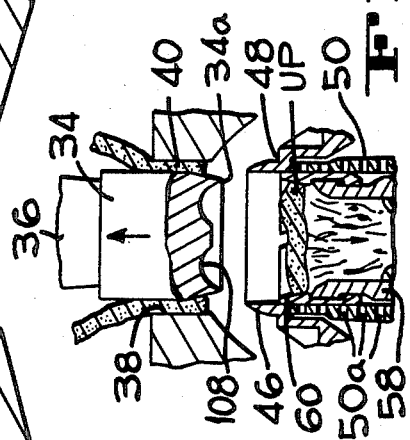

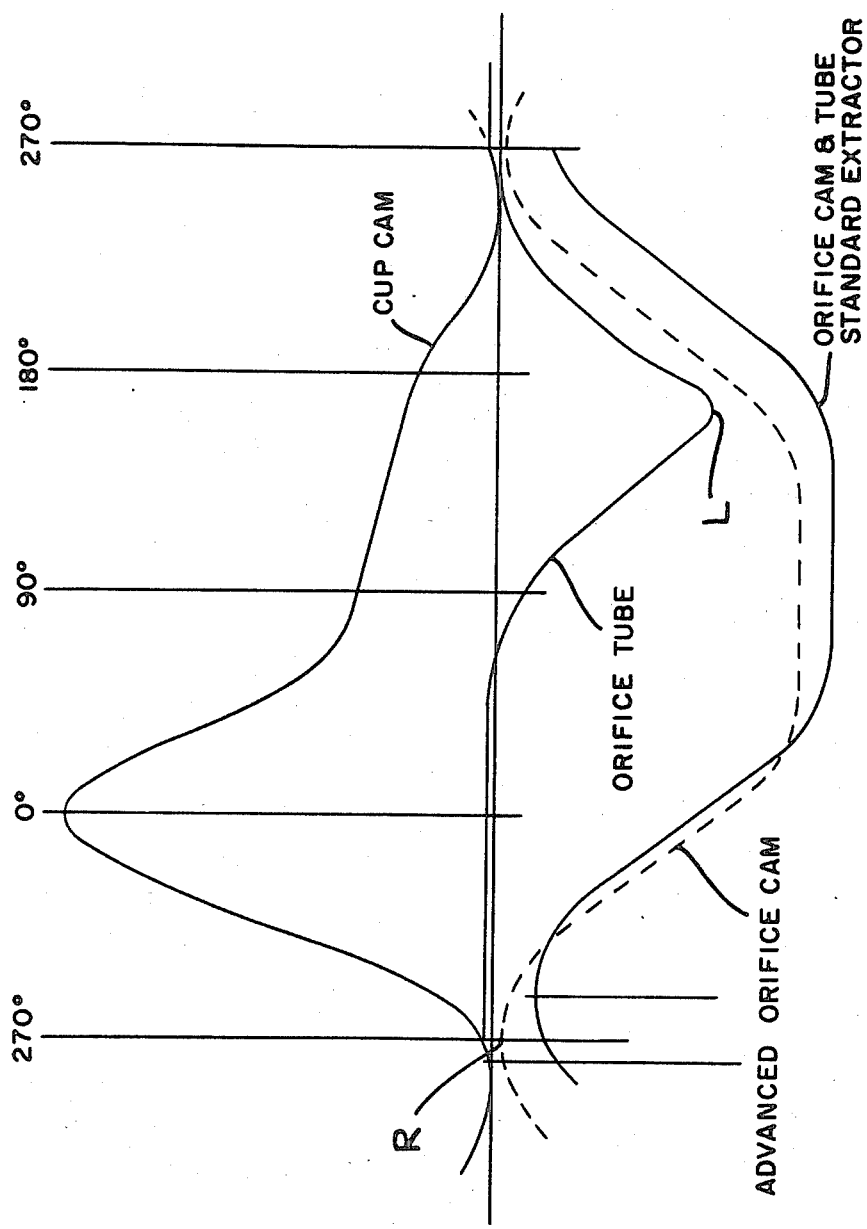
FIG_10

CITRUS JUICE EXTRACTOR

This invention relates to extracting juice from citrus fruit and more particularly to methods and apparatus for extracting juice from a whole citrus fruit.

Patented prior art relating to the subject matter of the present invention includes the U.S. Pat. Nos. 2,649,730 to Hait, 2,780,988 and 4,376,409 to Belk and 4,309,943 to Larsen. By reference thereto it is intended that they and the prior art cited therein be made part of this disclosure.

While the subject matter of the present invention has substantial similarities to the construction and mode operation of the referenced patents, certain operating elements are arranged so that the cut surfaces of the fruit are substantially shielded from the juice flow path and thus oils liberated do not mix with the juice in the course of flowing to a collection manifold.

Accordingly, one aspect of the present invention involves maintaining the cut surfaces of the rind or skin, resulting from cutting generally circular diametrically opposed plugs, shielded from the juice flow path.

BRIEF DESCRIPTION OF DRAWINGS

FIG. 1 is an elevation partly in section of juice extracting apparatus incorporating the principles of the present invention, FIG. 2 is an enlarged section taken substantially along the line 2—2 of FIG. 1 showing certain details of mounting a magnet, FIG. 3 illustrates an item of fruit in the cavity of the lower receiving cup with the opposed upper cup, also formed with a cavity, moving toward the fruit, FIG. 4 illustrates compression of the fruit as the upper cup interfits and moves toward the lower cup, FIG. 5 illustrates additional movement of the upper cup and further compression of the fruit which in part results in extruding or forcing the rind or peel to pass through passageways formed in the upper cup, FIG. 6 shows the rind or peel of the fruit completely forced out of the cavity and juice continuing to flow through the strainer tube while the orifice tube is maintained in a depressed position, FIG. 7 shows the relationship of parts when juice extraction has been essentially completed at which time the orifice tube approaches the upper cup, FIG. 8 is substantially similar to FIG. 7 but it shows the orifice tube at its maximum extent of travel toward the upper cup to permit capture and removal of the upper plug, FIG. 9 shows the retention of the upper plug in the orifice tube while the upper cup is moving upwardly and the orifice tube is concurrently moving downwardly, and FIG. 10 is a graphic representation showing the phase relationship the upper cup displacing cam and the concurrent displacement of the orifice tube of the prior art and in accordance with the present invention.

BRIEF DESCRIPTION OF THE PREFERRED EMBODIMENT

A juice extracting machine made in accordance with the present invention is illustrative in FIG. 1, and generally indicated by the numeral 20, includes an upper cup 22 and a lower cup 24. The upper and lower cups are formed with generally hemispherical cavities 26 and 28 defined by a plurality of radial extending circumferentially spaced fingers 30 and 32 which are related such that the fingers of the upper and lower cups, 30 and 32, interfit or interdigitate so that the generally spherical cavity produced by the hemispherical cavities 26 and 28 progressively reduces the volume thereof as the upper cup 22 is moved toward the lower cup 24. The upper cup 22 is provided with a circular cutter 34 fastened to a drive rod 36 which has its upper drive end (not shown) driven by a cam to effect displacement of the upper cup 22 toward the lower cup 24. A cam suitable to effect reciprocation of the upper cup is shown in the above reference Hait patent and it is identified by numeral 143. The circular cutter 34 is disposed within a bore 38 formed in the base of the upper cup and being of larger diameter than the diameter of the circular cutter 34 to define an annular passageway 40 which serves to expell the rind or peel of an orange or citrus fruit which has been subjected to extraction.

The fingers 32 of the lower cup 24 are integral with a base member 42 fitted onto a base plate 44 taking the general form of a truncated cone. Disposed within the base plate and diametrically opposed the circular cutter 34 is a fixed circular cutter 46 formed with a shoulder 48 against which the upper end of a strainer tube 50 is disposed while the lower end of the strainer tube is clamped by a nut 52 to the lower wall 54 of a juice manifold 56. As shown in FIG. 1 the strainer tube is formed with a relatively thin wall having a plurality of generally uniformily sized aperatures through which juice flows during the extraction process and is collected in the juice manifold 56. Slideably fitted within the strainer tube 50 is an orifice tube 58 having its upper end under cut to form a land 58a for retaining a split ring 60 having a tapered projecting portion sharpened so that its sharpened end is adjacent to the cutting edge of the lower cutter 46.

On commencement of an extraction cycle the orifice tube is located so that the split ring is adjacent the lower cutter 46 (FIGS. 3 and 4) and its primary purpose when so oriented is to capture and retain the Lower Plug of skin cut by the knife 46. As will be explained hereinafter the orifice tube 58 is moveable and slideable within the strainer tube during the process of extracting juice from a citrus fruit.

The internal pressure generated during compression of a fruit between the upper and lower cups is in part determined by the resistance generated by introducing the upper and lower plugs in the orifice tube 58 and by a restricter tube 62 disposed within and fixed to the orifice tube 58. As more clearly illustrated in FIG. 3 the upper end of the orifice tube is located a distance approximately equal to the internal diameter of the orifice tube below the upper sharpened end of the split ring 60. As will be explained hereinafter the retention and passage of the upper and lower plugs in the orifice tube and thence to the restricter tube 62 provides sufficient resistance to the internal pressure of the fruit as it is in the process of being extracted and provides a passageway through which the plugs and the rag material may be disposed of.

As shown in FIG. 2 the orifice tube which is slidably fitted within the strainer tube 50, has its lower end threaded at 64 to a bushing 66 which is also formed with external threads on which is threaded an arbor 68. The bushing 66 is formed with a flange 70 mating with a similar flange 72. As will be observed by inspection of FIG. 2 the outer radial surfaces of the flange of 70 and 72 are tappered so that a complimentary shaped band 74 joins the bushing 66 to a stop or abutment member 76 being bored to receive a tubular guide rod 78 and formed with an annular groove 80 for reception of the upper end of a tubular elastimeric member 82 resting on a support plate 83 fixed to an orifice beam 84. Rod 78 extends freely through the orifice beam 84 which is reciprocated, by rods 86 actuated by a cam (such as cam 142 in the Hait patent) to raise and lower the orifice beam in synchronism with cup operation.

Means are provided to releasably retain the orifice tube 58 to the limit of its upper travel (FIGS. 3 and 4) and to effect its downward movement to the limit shown in FIG. 1. Preferably such means comprises a cup shaped magnet 88. As shown in FIG. 2 a retainer ring 90 has an upper portion 92 threaded into the nut 52 and its lower portion formed with a shoulder 94 which may bear against a complementary shoulder 96 of the magnet 88. The magnet is formed with a plurality of circumventially spaced slots 98 in which resides at least one pin 100 fixed to the retainer ring 90. The upper surface of the magnet bears against a washer like ring 102 secured, preferrably by welding, to the lower wall 54 of the juice manifold 56.

The arbor 68, threaded on the bushing 66, maybe clamped in an adjusted position along the threaded portion of the bushing 66 by screw 104 and the adjustment of the arbor serves to locate the arbor against or spaced from the surface 106 of the magnet. For example, if the arbor is adjusted so that a gap is defined the reluctance produced by the gap would render the holding force of the magnet, as experienced by the arbor 68, less than if the arbor were to make contact with the surface 106. In this way the magnetic force applied to the bushing 66 and the stop member 76 could be varied by merely changing the position of the arbor 68. While the preferred mode of the present invention utilizes magnet 88 it should be recognized by those familiar with the art that a variety of force adjustable latching mechanisms are available to retain the orifice tube in the position shown in FIGS. 3 and 4. As will be explained in greater detail hereinafter raising the orifice beam 84 by cams acting through rods 86 raises the orifice tube 58, the bushing 66 threaded to the lower end of the orifice tube and the stop member 76 coupled to the bushing 66 by the band 74 until the orifice tube reaches the position shown in FIGS. 3 and 4.

During the course of compressing a fruit between the cups 22 and 24 the liquid pressure generated against the plugs (upper and lower) is sufficient to overcome the latching force of the magnet 88 causing the orifice tube to drop against the tubular elastomeric member 82 which disapates and cushions the gravity force of the descending orifice tube. The sequence of operation generally descriptively illustrating various stages of extracting juice from a citrus fruit is shown in FIGS. 3 to 8. It is to be recalled that the primary objective of the present invention is to manage and control the position of diametrically opposed upper and lower plugs so that the juice flow path does not encounter or flow across the freshly cut surfaces of the plugs and the fruit.

Now referring to FIG. 3 a fruit F residing in the cavity 28 of the lower cup 24 will be compressed when the hemispherical cavity 26 of the upper cup 22 engages its surface. At this time the rind from a previously extracted fruit is contained in the annular opening 40 and a plug, usually the upper plug (up) of the previously extracted fruit, is retained in the split ring 60. The orifice tube 58 is positioned at its upper limit of travel by raising of the orifice beam 84 and is held in this position by the attractive force of the magnet 88 transmitted to the arbor 68 across a predetermined gap in the magnetic circuit. FIG. 4 shows the early stage of compressing the fruit whereby a lower plug LP is forced in a split ring 60 displacing the upper plug from the previously compressed fruit downwardly toward the restricter tube 62. It should be particularly noted that the fresh cut surfaces of the plug are tightly held against the inner tappered surface of the split ring 60 while the cut surface of the fruit adjacent the knife 46 is held firmly against the outer surface of the knife 46. The upper circular cutter 34 during the initial stages of compression cuts an upper plug UP which, as a result of compression is retained in a cavity 108 being provided to define a relieved sharp cutting edge 34a. The freshly cut edges of the upper portion of the fruit are directed into the annular opening 40 and are thus also effectively shielded from juices generated by compressing the fruit.

The condition illustrated in FIG. 5 occurs when sufficient internal compression forces have been generated to overcome the attractive magnetic force between the magnet 88 and the arbor 68. At that instant the orifice tube freely drops and its movement is arrested when the abutment or stop member 76 impacts on the tubular elastromeric member 82. Juice freely flows from the interior of the fruit down the strainer tube 50 and through the plurality of appatures 50a formed through the wall of the strainer tube. It should be noted that the lower plug LP, as well as the upper plug UP from a previously extracted fruit are still held by the split ring 60 and the surface of the lower plug in contact with the juice path is the inner surface of the rind and that the freshly cut surfaces of the plug are masked by the split ring 60. Juice flowing through the strainer tube 50 cascades downwardly, in part over the surface of the strainer tube 50 and enters the juice manifold 56 through an opening 56a. When the upper cup reaches its lowest limit of travel (FIG. 6) the rind from the extracted orange or fruit is substantially completely forced through the annular opening 40 except for a small portion which is retained in the annular opening. At this time extraction is substantially completed but there remains in the strainer tube some whole juice sacs and rag.

After the orifice tube has dropped to the position shown in FIG. 1 the cam (not shown) reciprocating the rods 86 displaces the orifice beam upwardly (FIG. 7) and of course the orifice tube moves upwardly toward the cutter 34 compressing the material, which contains the remaining juice sacks, and thus extracting the remaining juice. It should be noted that the plugs residing in the orifice held by the split ring 60 have been displaced downwardly in the orifice tube and come to rest against the upper edge of the restrictor tube 62. The plugs continue to fulfill the requirement of providing a substantially solid boundary wall effectively stopping the flow of juice that may be extracted at this stage from flowing down the interior of the restrictor tube 62.

FIG. 8 illustrates the upper limit of travel by the orifice and restrictor tubes and it should be particularly noted that the split ring 60 embraces the tappered outer edges of the upper cutter 34 and that the plugs (the lower plug LP and the upper plug UP from a previously extracted fruit are forced into the restrictor tube 62. The material remaining within the confines bounded by the upper cutter and the orifice tube essentially consist of rag material which interconnects the upper plug UP and the lower plug LP and contributes substantially, together with some contribution by the split ring 60, to remove the upper plug contained within the upper cutter 34 and position it such that it will assume the position shown in FIG. 3. At this time (FIG. 9) the upper cup is displaced upwardly by the cam and the orifice tube having the upper plug retained by the split ring 60 slightly retracts.

FIG. 10 graphically illustrates the movement of the upper cup determined by the cam disclosed in the above referenced Hait application and the movement of the orifice tube in accordance with prior art extractors shown in solid line and legend ORIFICE CAM AND TUBE STANDARD EXTRACTOR and movement of the orifice tube, also shown in solid line, in accordance with the present invention. The graph depicts one revolution of a main shaft (such as shaft 138 of the U.S. Pat. No. 2,649,730). One cycle of operation commences and ends at 270 degrees since this is a convention adopted in the type of extractor herein disclosed. The cam displacing the upper cup (cam 143 of the U.S. Pat. No. 2,649,730) is at its lower limit of travel at approximately 255 or 260 degrees and at this point maximum compression of a fruit occurs. The cup is fully retracted at 0 degrees at which time a fruit is discharged into the lower cup 24 (FIG. 3). The orifice tube assumes the position within the strainer tube such that the split ring 60 is adjacent the lower plug cutter 46 (FIGS. 3 and 4) until at approximately 45 degrees from the 0 degree reference and at a time when the upper cup is being displaced downwardly by the cam, the orifice tube descends rather rapidly once the fruit compression forces are succifient to break or overcome the magnetic attraction of the magnet 88. The orifice tube descends freely until its movement is arrested by the flexible member 82 and the parts assume the relationship shown in FIG. 1.

While the orifice cam according to the present invention has substantially the same profile as the orifice cam 142 of the above referenced Hait patent, it is set on the shaft so that its phasing relative to the cup cam is advanced. The differential phasing is shown by the dotted line graph trace as compared with the solid line graph trace legend OFFICE CAM AND TUBE STANDARD EXTRACTOR while the relationship of the cam according to the present invention is legend ADVANCED ORIFICE CAM. The orifice cam of the present invention displaces the orifice tube upwardly to the extent shown in FIGS. 3 and 4 during the initial stages of extraction and at such location of the orifice tube is represented by the intersection R which is closely adjacent the absicca and follows the dash line trace during the cycle. It should be appreciated though that the oricife tube, since it is held in its upper position by a magnet 88, does not follow the motion of the orifice beam 84 which is directly mechanically connected to the cam.

Commencing at approximately 70° and completed at 170° the orifice tube 58 is in its lowered position resulting from the force exerted by comprising the fruit being sufficient to overcome the attractive or retaining force of the magnet 88. While the orifice tube is in its lower most position (FIGS. 5 and 6) the juice is free to flow through the strainer tube operatures 50a. At its lowest point L the trace of the orifice tube is spaced from the dotted graph by a distance equal to the axial length of flexible member 82. As the orifice cam path (dotted line) progress toward the abcissa (170° to 260°) the curve traced by the orifice tube instaneously deviates therefrom due to the compression and expansion of the flexible member 82. For example, maximum compression occurs at approximately 260° and the orifice tube trace, positive and parallel to the abcissa, is a result of unloading or expansion of member 82. The positive and parallel relation is maintained for approximately 140° even though the orifice cam curve (dotted line) embarks on its negative going direction. As explained above the orifice tube is retained in its raised position by the magnet 88.

Although the best mode contemplated for carrying out the present invention has been herein shown and described, it will be apparent that modification and variation may be made without departing from what is regarded to be the subject matter of the invention.

What is claimed is:

1. An apparts for extracting juice from a whole citrus fruit of the type having opposed hemispherical cups of the character disclosed movable toward each other and in which a fruit is contained in one of the cups, said apparatus comprising means for cutting diametrically opposed generally circular portions from the rind as the cups move toward each their compressing the fruit therebetween, means carried by one of said opposed cups and in communication with the interior of the fruit for establishing a juice flow path to a juice collecting device, said flow path establishing means including an elongate aperture tubular member to allow passage of juice, means reciprocally mounted within said apertured tubular member for retaining said circular portions of the rind, said retaining means carried by a solid tubular member and maintaining the circular portions in a plane normal to the axis of said apertured tubular member, means for reciprocating the retaining means carried by said solid tubular member in synchronism with movement of the cups toward and away from each other, and means responsive to pressure resulting from compression of the fruit, against said circular portions carried by said retaining means for displacing said solid tubular member relative to said apertured tubular member.

2. A juice extraction apparatus of the character described comprising opposed hemispherical cups for containing a whole citrus fruit and moveable toward each other to compress the fruit, means associated with each cup for cutting diametrically opposed plugs from the skin of the fruit during compression of the fruit and means for retaining the plugs so that their orientation as removed from the fruit is maintained while the fruit is being compressed between the cups, at least one of said retaining means shielding the severed edge of the plug from juice flowing through the opening formed thereby, means associated with one cup providing a passageway for discharging the skin of the fruit from the cups in the course of compressing the fruit and means for transferring one of said diametrically opposed plugs from a first restrained location to a second restrained location prior to the arrival of a subsequent fruit to one of said hemispherical cups.

3. An apparatus for extracting juice from a whole citrus fruit having a rind comprising:

a pair of opposed hemispherical cups, one of which is adapted to support a whole fruit, said cups moveable toward each other during a juice extracting cycle;

first and second means for cutting and retaining plugs from said rind;

retractable means for retracting said second means from said rind and establishing a juice flow path in response to the pressure within said fruit being compressed reaches a predetermined level; and mechanical means for re-extending said second means for transferring the plug initially cut and retained by said first means to said second means for retention thereby.

* * * * *